April 11, 1944.  A. C. DURDIN, 3D  2,346,367
AERATION APPARATUS
Filed Dec. 31, 1941  3 Sheets-Sheet 1
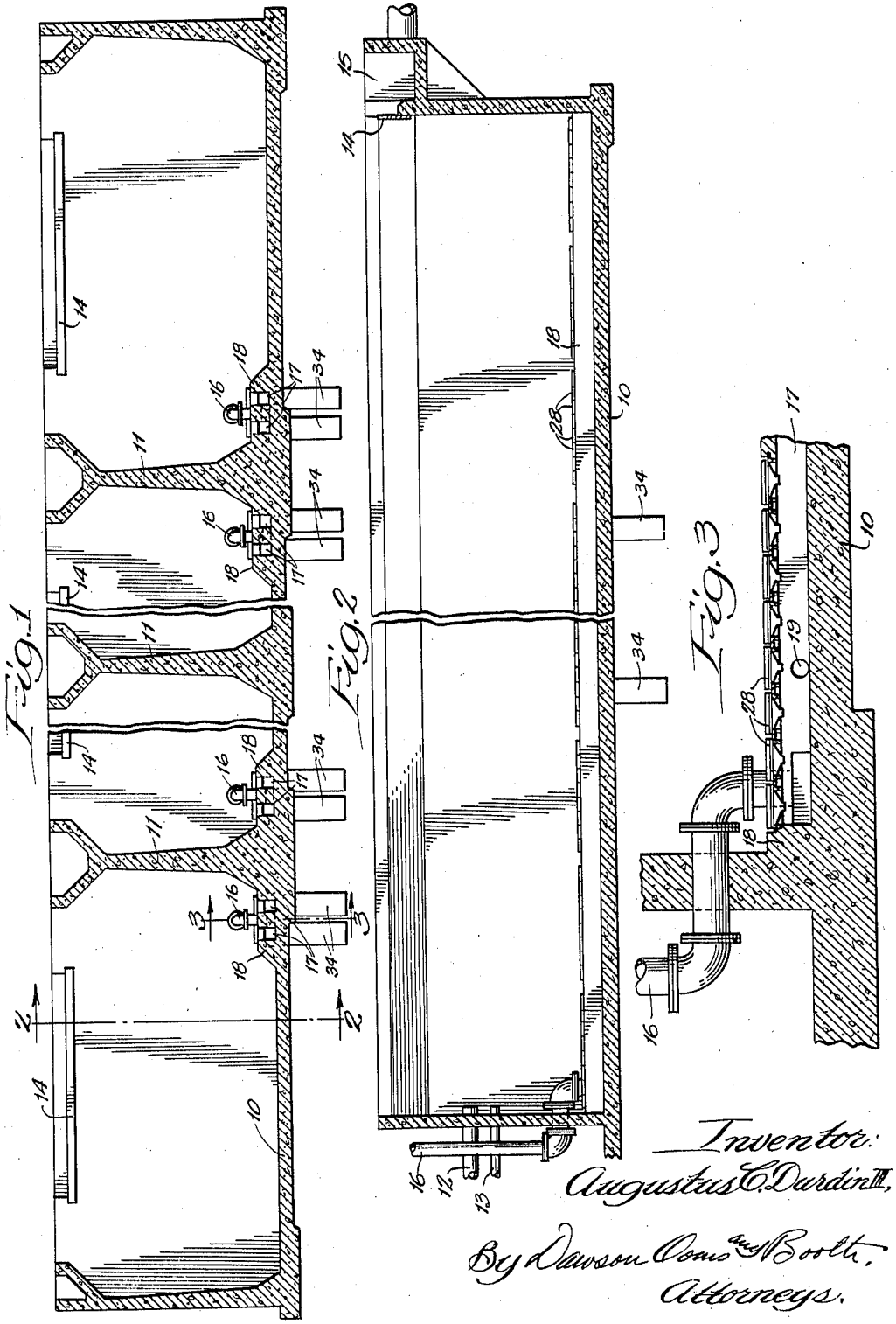

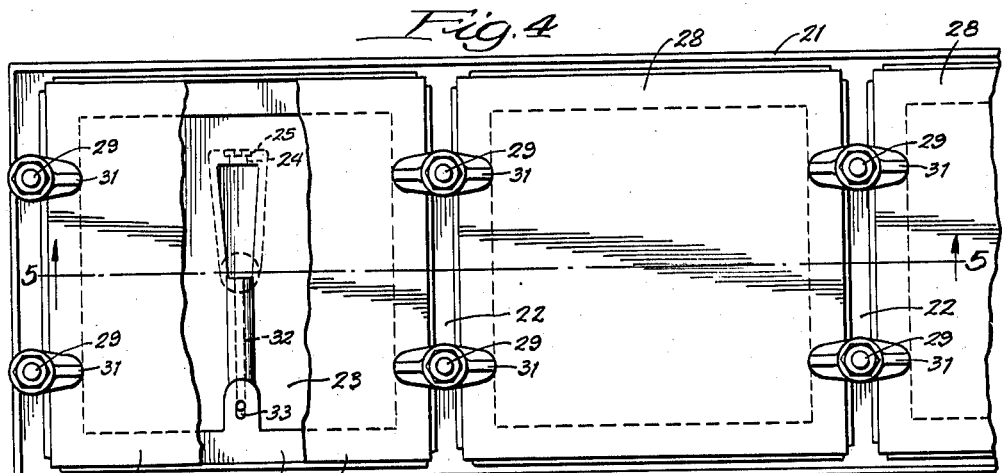
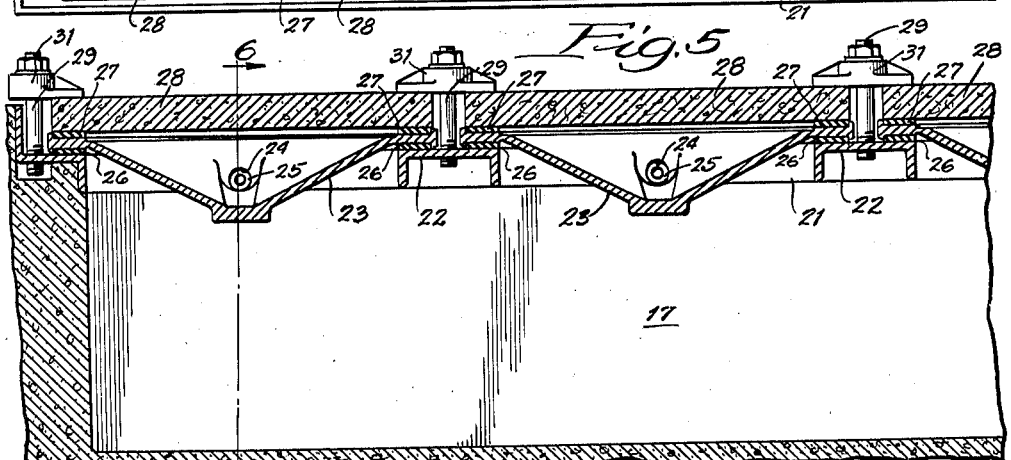
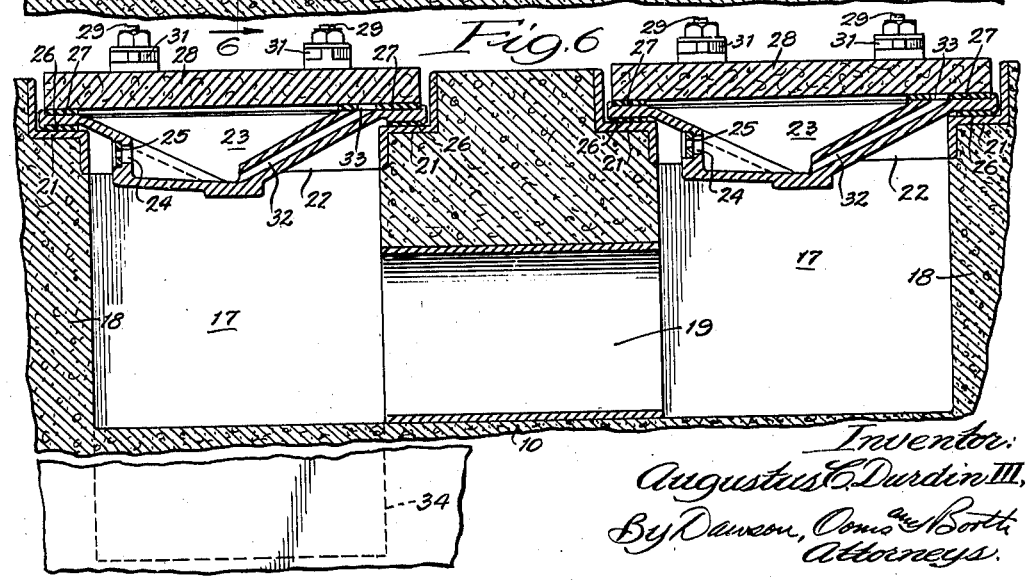

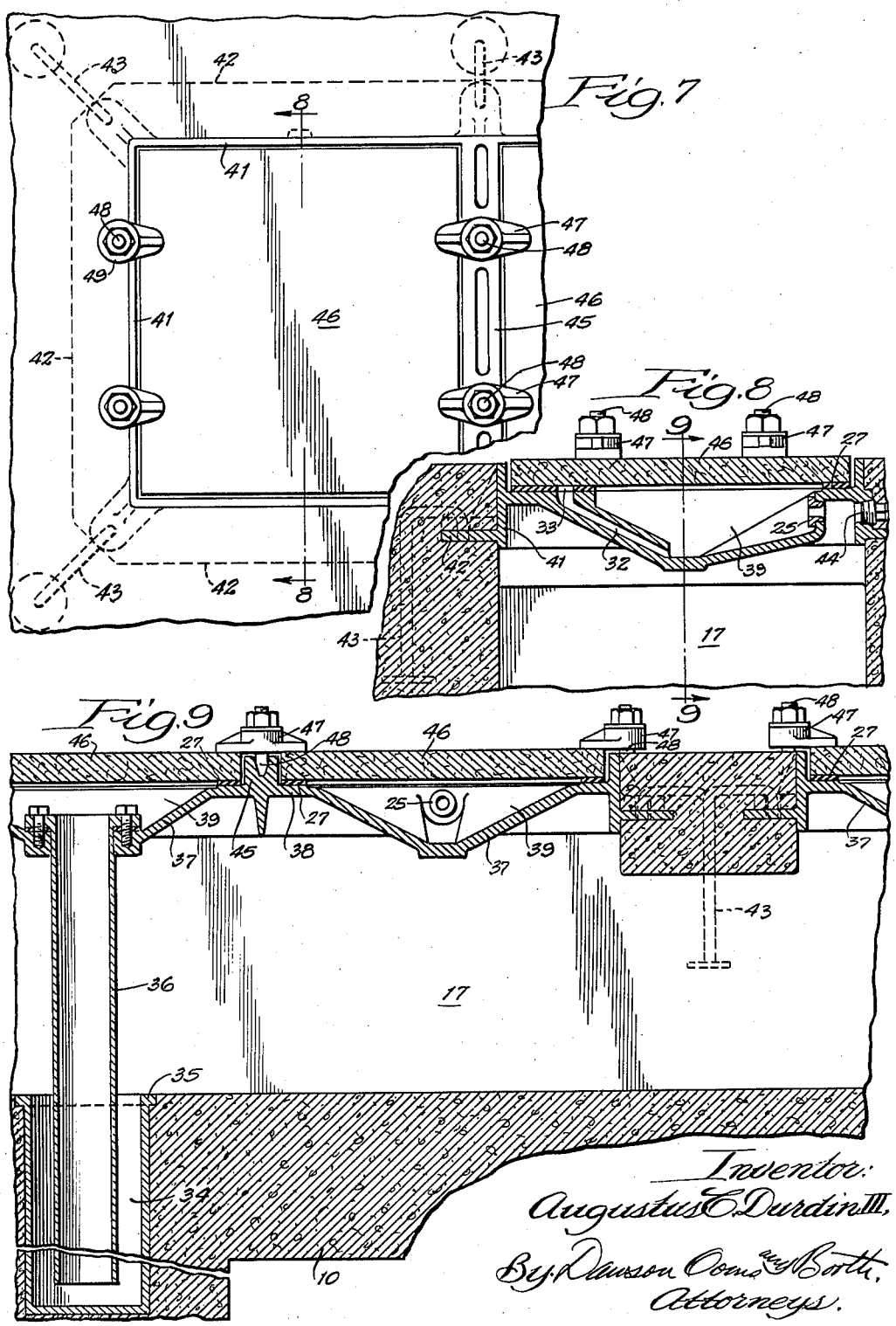

Patented Apr. 11, 1944

2,346,367

UNITED STATES PATENT OFFICE 2,346,367

AERATION APPARATUS

Augustus C. Durdin, III, Skokie, Ill., assignor of twenty-four per cent to Lewis H. Durdin, Franklin, Pa., and fifty-two per cent to Augustus C. Durdin, Jr., Chicago, Ill.

Application December 31, 1941, Serial No. 425,045

14 Claims. (Cl. 261—122)

This invention relates to aeration apparatus and more particularly to apparatus submerged in a body of liquid to distribute air or other gas therethrough, as for example, in the treatment of sewage.

One of the objects of the invention is to provide an aeration apparatus in which the air is distributed through individual air boxes having porous replaceable covers.

Another object of the invention is to provide an aeration apparatus in which the air is distributed through one or more air conduits closed on one side by a series of air boxes individually communicating with conduits and having porous portions through which the air is discharged into the liquid. According to one feature of this construction, the communication of the several air boxes with the conduit may be individually controlled to obtain the desired distribution of air through the liquid.

Still another object of the invention is to provide an aeration apparatus including an air box of simple, inexpensive construction which may easily be installed in the apparatus.

The above and other objects and advantages of the invention will be apparent from the following description when read in connection with the accompanying drawings, in which:

Figure 1 is a transverse section through a sewage aeration tank embodying the invention;

Figure 2 is a longitudinal section on the line 2—2 of Figure 1;

Figure 3 is an enlarged partial section on the line 3—3 of Figure 1;

Figure 4 is an enlarged partial plan view;

Figure 5 is a section on the line 5—5 of Figure 4;

Figure 6 is a transverse section on the line 6—6 of Figure 5;

Figure 7 is a view similar to Figure 4 of an alternative construction;

Figure 8 is a section on the line 8—8 of Figure 7; and

Figure 9 is a section on the line 9—9 of Figure 8.

The illustrated construction comprises a series of aeration tanks arranged side by side with a common bottom wall 10 and vertical dividing partitions 11 separating the tanks. Sewage enters the tanks through an influent pipe 12 on one end of each tank, and return sludge is admitted to the tank through a pipe 13 adjacent the pipe 12. The liquid in the tank flows therefrom over a weir 14 at one end thereof into an effluent channel 15, from which it may be removed.

Sewage in the tank is adapted to be aerated by air entering through a conduit 16, which extends into the tank and communicates with a pair of channels 17 extending along one side of the tank adjacent the bottom thereof. As shown, the bottom is formed with a raised step portion 18, in which the channels are formed, so that the upper surface thereof is elevated slightly above the bottom of the tank. While two channels have been shown in each tank, it will be understood that only one, or a number greater than two, might be employed, depending upon the particular installation. The channels have cross-communicating passages 19, as shown in Figure 6, at spaced points along their length to equalize the pressure therein.

In forming the channels, as best seen in Figures 4 to 6, Z-shaped metal strips 21 are secured along the edges thereof, and have connected thereto cross bars 22 at spaced points throughout their length. The channels 21 and bars 22 form a supporting frame to receive and carry a plurality of individual air boxes 23, formed by plates dished on their upper surfaces to leave generally conical cavities therein. Each air box is formed in its side with an air inlet opening 24, in which an orifice plate 25 may be mounted to regulate the inlet of air to the box. Instead of an orifice plate such as 25, control valves of the type more particularly disclosed and claimed in my co-pending application, Serial No. 424,441, filed December 11, 1941 may be used.

In the construction shown in Figures 4 to 6, the air boxes are formed with flat edge portions adapted to rest on the channels 21 and the cross bars 22, gaskets 26 being interposed therebetween to form a fluid tight seal. Similar gaskets 27 are arranged on the upper surfaces of the flanges to support porous diffuser plates 28 formed of any suitable air diffuser material such as carborundum or carbon compounds. The air boxes and the diffuser plates are held in place by bolts 29 secured to the cross bars 22, and carrying clamps 31 which engage the upper surfaces of the diffuser plates. By this construction, the air boxes and diffuser plates are individually mounted so that, in the event of damage to one or more of the diffuser plates, they can easily be replaced.

In operation of the apparatus, air entering through the conduit 16 will travel through the channels 17 and pass through the orifice plates 25 into the several air boxes. From these boxes, the air will be diffused through the plates 28 to ascend in the form of fine bubbles through the liquid in the tanks. In the event that the air is shut off, liquid will seep through the diffuser plates into the air boxes and may eventually get into the channels 17.

In order to prevent this liquid from blocking the air boxes or from interfering with proper operation thereof, means are provided to remove the liquid from the air boxes. As shown, such means are formed by water conduits or channels 32 formed in one side of each of the air boxes, and extending therealong from the bottom part of the air boxes to an opening 33 flush with the top surfaces of the air boxes. The diffuser plates 28 overlie not only the open top of the air box itself, but also the opening 33 of the channel 32. When air pressure is applied to the air boxes any liquid therein will be forced up the channels 32 and out the openings 33 through the diffuser plates and into the tank. In this way, the liquid is quickly conducted away from the lower surfaces of the diffuser plates to permit proper flow of air through the plates at all times.

Any water collecting in the channels 17 might tend to create surges therein interfering with proper distribution of air through the several air boxes. In order to remove this water, the lower surfaces of the channels are formed at one or more points with water traps 34. The detailed construction of the water traps is illustrated in Figure 9 as including a cup-shaped member 35 set in the bottom of the channel 17 to receive water therefrom. A vertically extending pipe 36 projects down into the cup-shaped member 35 and is connected at its upper end to one of the air boxes. This air box 37 is formed in its bottom with an opening to receive the tube 36 and has no other communication with the channel. Also, the water channel 32 may be omitted from this particular air box.

In operation of the apparatus, any liquid accumulating in the channel 17 will drain into the traps 34 and will be forced by the air pressure up through the tubes 36 and out through the diffuser plate, closing the air box 37. The length of the pipe 36 is preferably made such that the head of water in it will be somewhat greater than the average head loss through the control orifices, so that, normally, no air will be discharged through the air box 37. If it is desired to make this air box effective for distribution of air, the pipe 36 may be made shorter so that air pressure in the channel will be sufficient to force all of the water therefrom, after which air may flow in the air box 37 to be discharged through its diffuser plate.

An alternative construction is illustrated in Figures 7, 8 and 9, differing from that previously described only in the construction of the air boxes, and in the manner of supporting them. All parts in Figures 7, 8 and 9 corresponding to like parts in Figures 1 to 6 have been indicated by the same reference numerals.

In this construction, the air boxes are formed in elongated plates 38, each containing a series of depressions forming a plurality of air boxes 39. One of the air boxes in each plate may be constructed as shown at 37, and described above, while the others are preferably of the form illustrated in Figure 8, including the water channel 32 and the air control orifice 25. The plate is formed with a vertical flange 41 having a horizontal projection 42 which is set into the sides of the channel to support the plate thereon. Anchor rods 43 may be carried by the projections 42 and set into the material of the channels to anchor the plates securely therein. In one preferred construction in which the channels are formed of concrete, the anchor rods and plates may be cast in place or may be grouted in after the remainder of the channel is cast.

In order that the necessary openings may be formed to receive the orifices 25, the flange 41 may be drilled and the opening therein closed by a plug 44, as shown in Figure 8.

As will be seen in Figure 9, the flange 41 projects above the plate 38 and additional cross flanges 45 may be provided between the air boxes, as shown. Thus, the upper surfaces of each air box is surrounded by a vertical projecting flange forming a cavity to receive diffuser plates 46, which may be held in place by clamps 47 carried by bolts 48 secured to the plates.

The operation of this apparatus is substantially identical with that of Figures 1 to 6, except that the air boxes cannot be individually removed. However, formation of a plurality of air boxes in a single plate presents certain advantages in economy which may be preferred in some instances.

While two embodiments of the invention have been shown and described in detail, it will be understood that these are illustrative only and are not to be taken as a definition of the scope of the invention, reference being had for this purpose to the appended claims.

What is claimed is:

1. Aeration apparatus comprising means forming an air conduit, means in one side of the conduit forming a plurality of air boxes open at their outer sides and communicating separately with the air conduit, a plurality of porous diffuser plates secured over the open sides of the air boxes respectively, and a liquid discharge passage in each air box leading from the lower portion thereof to a confined portion of the corresponding diffuser plate to conduct liquid from the air box to the inner face of said plate.

2. Aeration apparatus comprising means forming an air conduit, means in one side of the conduit forming a plurality of air boxes open at their outer sides and all but one communicating with the air conduit, a plurality of porous diffuser plates secured over the open sides of the air boxes, a water trap in the air conduit, and a pipe leading from the water trap to said one of the air boxes to conduct water from the trap to the one of the air boxes to be discharged through the diffuser plate thereof.

3. Aeration apparatus comprising a tank adapted to contain liquid, means forming an open top air channel in the lower part of the tank, a series of open top air boxes extending across the top of the air channel and each having restricted communication with the channel, the air boxes having water channels formed therein extending from the bottoms of the air boxes and terminating flush with the open tops thereof, and a plurality of porous diffuser plates secured over the open tops of the air boxes and the ends of the water channels.

4. Aeration apparatus comprising a tank adapted to contain liquid, means forming an open top air channel in the lower part of the tank, a series of open top air boxes extending across the top of the air channel and all but one having restricted communication with the channel, horizontal diffuser plates secured over the said open tops of the air boxes, a water trap in the bottom of the air channel to collect liquid in the channel, and a pipe extending from the water trap to one of the air boxes to conduct water thereto.

5. Aeration apparatus comprising a tank adapted to contain liquid, means forming an open top air channel in the lower part of the tank, a series of open top air boxes extending across the top of the air channel and all but one having restricted communication with the channel, the air boxes having water channels formed therein extending from the bottoms of the air boxes and terminating flush with the open tops thereof, a plurality of porous diffuser plates secured over the open tops of the air boxes and the ends of the water channels, a water trap in the bottom of the air channel to collect liquid in the channel, and a pipe extending from the water trap to said one of the air boxes to conduct water thereto.

6. Aeration apparatus for a tank adapted to contain liquid, means forming an open top air channel in the lower part of the tank, a plate overlying and secured to the channel and formed in its upper surface with a plurality of depressions forming air boxes in the channel, means in the plate providing individual restricted communication between the air boxes and the channel at points above the bottom of the boxes, and porous diffuser plates secured to the plate over the depressions therein and closing the tops of the air boxes.

7. Aeration apparatus for a tank adapted to contain liquid, means forming an open top air channel in the lower part of the tank, a plate overlying and secured to the channel and formed in its upper surface with a plurality of depressions forming air boxes in the channel, means in the plate providing individual restricted communication between the air boxes and the channel at points above the bottom of the boxes, means forming a liquid conduit in each of the depressions extending from the bottom to the top thereof, and porous diffuser plates secured to the plate over the depressions therein and closing the tops of the air boxes and liquid conduits.

8. Aeration apparatus comprising a tank adapted to contain liquid, means forming an open top air channel in the lower part of the tank, a plate overlying and secured to the channel and formed in its upper surface with a plurality of depressions forming air boxes, means in the plate providing individual communication between the air boxes and the channel, a downwardly extending pipe connected to one of the air boxes, and a cavity in the bottom of the air channel into which the pipe extends to form a water trap.

9. Aeration apparatus for a tank adapted to contain liquid, means forming an open top air channel in the lower part of the tank, a series of cross bars extending transversely across the channel, cupped plates supported at their edges on the cross bars and the sides of the channel with their intermediate cupped portions depending into the channel, said cupped plates being provided at a point above the bottoms thereof with restricted openings communicating with the channel, and porous diffuser plates overlying the cupped plates and providing air boxes in the channel.

10. Aeration apparatus for a liquid containing tank comprising means forming an air supply channel submerged in the liquid in the tank, means adjacent the channel forming a plurality of air boxes each open at the top, porous diffuser plates secured to the last named means and closing the tops of the air boxes, and means providing individual restricted communication between the air supply channel and the air boxes at a point above the bottom of the boxes.

11. Aeration apparatus for a liquid containing tank comprising means forming a submerged air channeled member for the tank, plate means overlying and secured to the channeled member and providing therewith an inner air conduit and a plurality of outer air boxes open at one side, porous diffuser plates secured to said plate means and closing the open sides of the air boxes and means in the plate means providing individual restricted communication between the air conduit and the interiors of the air boxes.

12. In an aeration apparatus for a liquid containing tank including a channel-shaped air supply member and a porous plate closing one side thereof, means adapted for mounting between said porous plate and member, comprising a dished plate cooperating with said porous plate to provide an air box in the channel member, and said dished plate having a restricted opening therein above the bottom thereof providing an air inlet to the air box from the channel member.

13. The structure defined in claim 12, wherein the dished plate is formed in its upper surface with a plurality of depressions each cooperating with a porous plate to provide air boxes in the channel member, and each depressed portion of the plate having a restricted opening therein providing individual air inlets to the air boxes from the channel member.

14. The structure defined in claim 12, wherein the dished plate is further provided with means forming a liquid discharge passage extending from the bottom of the dished portion to a point substantially flush with the upper surface of the plate.

AUGUSTUS C. DURDIN, III.